United States Patent [19]

Bedford

[11] Patent Number: 5,161,518
[45] Date of Patent: Nov. 10, 1992

[54] FLOAT ASSEMBLY FOR STEAM COOKING DEVICE

[75] Inventor: James P. Bedford, Willoughby, Ohio

[73] Assignee: Cleveland Range, Incorporated, Cleveland, Ohio

[21] Appl. No.: 739,601

[22] Filed: Jul. 31, 1991

[51] Int. Cl.⁵ .............................................. F24H 1/18
[52] U.S. Cl. ..................................... 126/348; 126/369; 126/20; 200/61.2; 200/84 R
[58] Field of Search ..................... 126/369, 348, 20; 200/61.04, 61.2, 84 R; 219/401

[56] References Cited

U.S. PATENT DOCUMENTS 3,028,463  4/1962  Birch ................................... 200/84 R
3,604,895  9/1971  MacKay ............................... 126/369
4,081,638  3/1978  Thorn et al. ......................... 200/84 R Primary Examiner—Carroll B. Dority
Attorney, Agent, or Firm—Porter, Wright, Morris & Arthur

[57] ABSTRACT

A float assembly for use in a steam cooking device and means for spraying a fluid toward the float assembly to keep mineral deposits and other scale from forming on the float assembly.

15 Claims, 2 Drawing Sheets

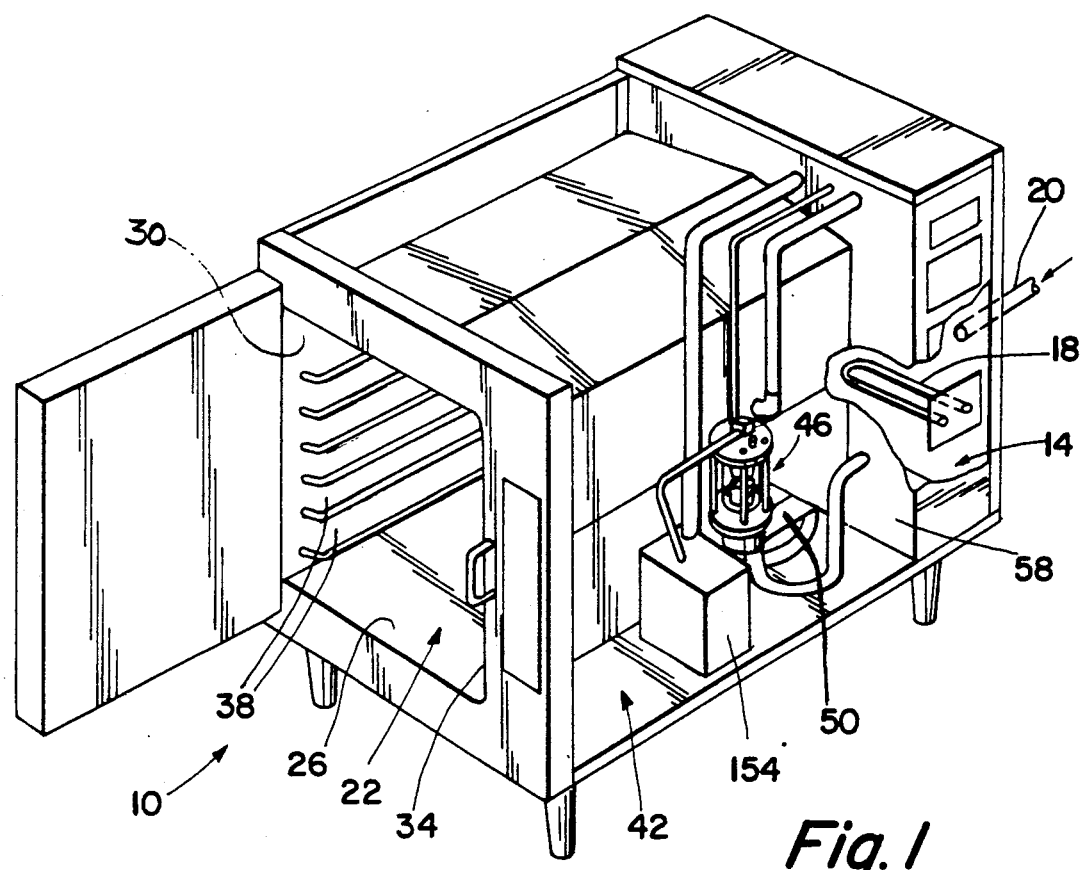
Fig. 1
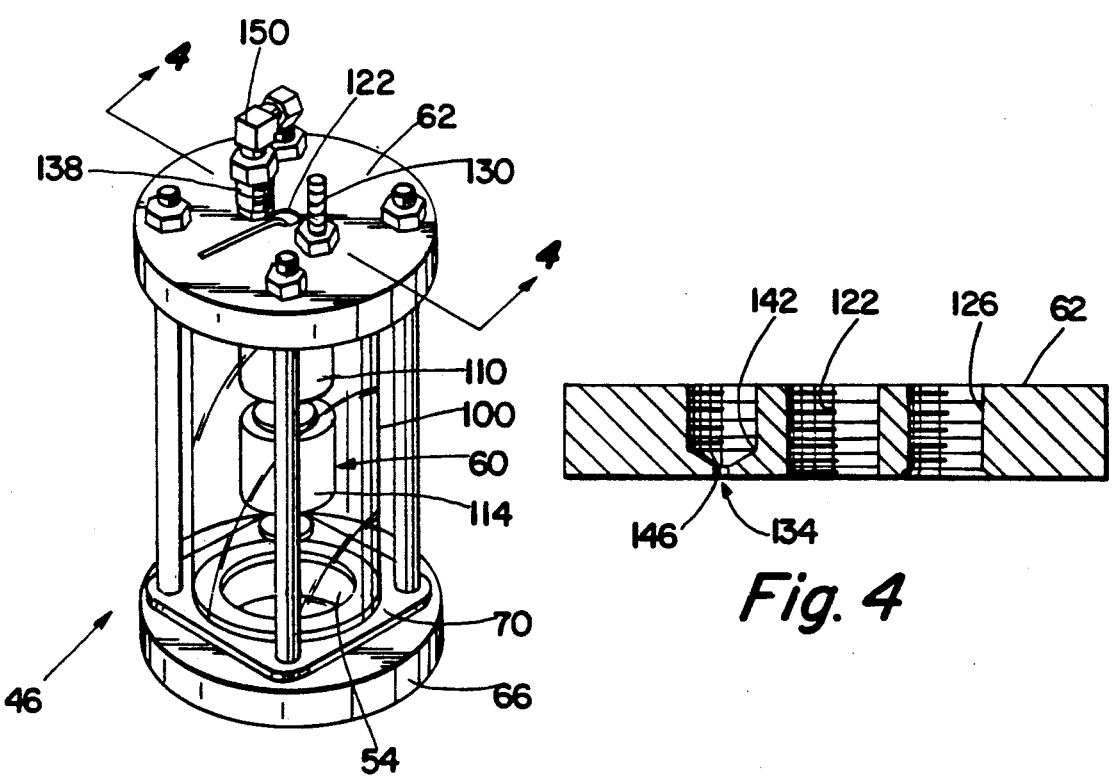
Fig. 2
Fig. 4

FLOAT ASSEMBLY FOR STEAM COOKING DEVICE

BACKGROUND OF THE INVENTION

This invention relates to steam cooking devices, and particularly to arrangements for maintaining the water in the boiler of such devices at a desired level by operation of a float assembly.

The advantages of steaming certain foods rather than cooking these foods by other methods have become well-recognized in recent years. For example, when meats are cooked under dry conditions, as when baked, the meat loses its intrinsic moisture and may become dried out and unpalatable. Further, vegetables contain certain valuable minerals which are retained if the vegetables are steamed rather than cooked by other means, such as boiling.

Current steam cooking devices utilize steam from a steam generator to cook or thaw food. This steam is transported from the steam generator to a cooking chamber where it is introduced into the cooking chamber by a conduit or the like extending from the boiler to an opening in the wall of the cooking chamber.

The steam is produced by heating water which is contained in the steam generator or boiler. Many of these steam generators contain float assemblies to maintain a desired water level in the steam generator. In most instances, when the water level drops to a predetermined measured level after some of the water has been heated to produce steam, the float assembly activates to allow more water to enter the steam generator.

A problem with the operation of the float assemblies occurs due to the fact that the water in the steam generator contains minerals which form deposits on these float assemblies causing them to stick. There is currently no method of cleaning the floats except manually removing them and cleaning them by hand.

SUMMARY OF THE INVENTION

The invention provides a steam cooking device comprising a steam generating chamber adapted to contain water, means for heating the water to a temperature sufficient to produce steam, a float assembly associated with the steam generating chamber to maintain the water at a measured level and means for spraying a fluid onto the float assembly.

The invention also provides a float assembly comprising a body portion including a float switch assembly, a cap portion secured to the body portion, the cap portion having therein an aperture and spray means extending into the aperture for spraying a fluid against the body portion.

A principle feature of the invention is the spray means associated with the float assembly. This spray means allows for periodic cleaning of the float assembly without requiring manual removal and hand cleaning of the float assembly.

Other principal features and advantages of the invention will become apparent to one skilled in the art upon review of the following detailed description, claims, and drawings.

Float is internal of the steam generator and can be external of the steam generator. When float is internal spray nozzle is a part of the steam generator sidewalls or topwalls.

BRIEF DESCRIPTION OF THE DRAWINGS

FIG. 1 is a perspective view, partially broken away, of a steam cooking device embodying the present invention;

FIG. 2 is a perspective view of a float assembly embodying the present invention;

FIG. 4 is a sectional view taken along line 4—4 in FIG. 2.

Figure 3:
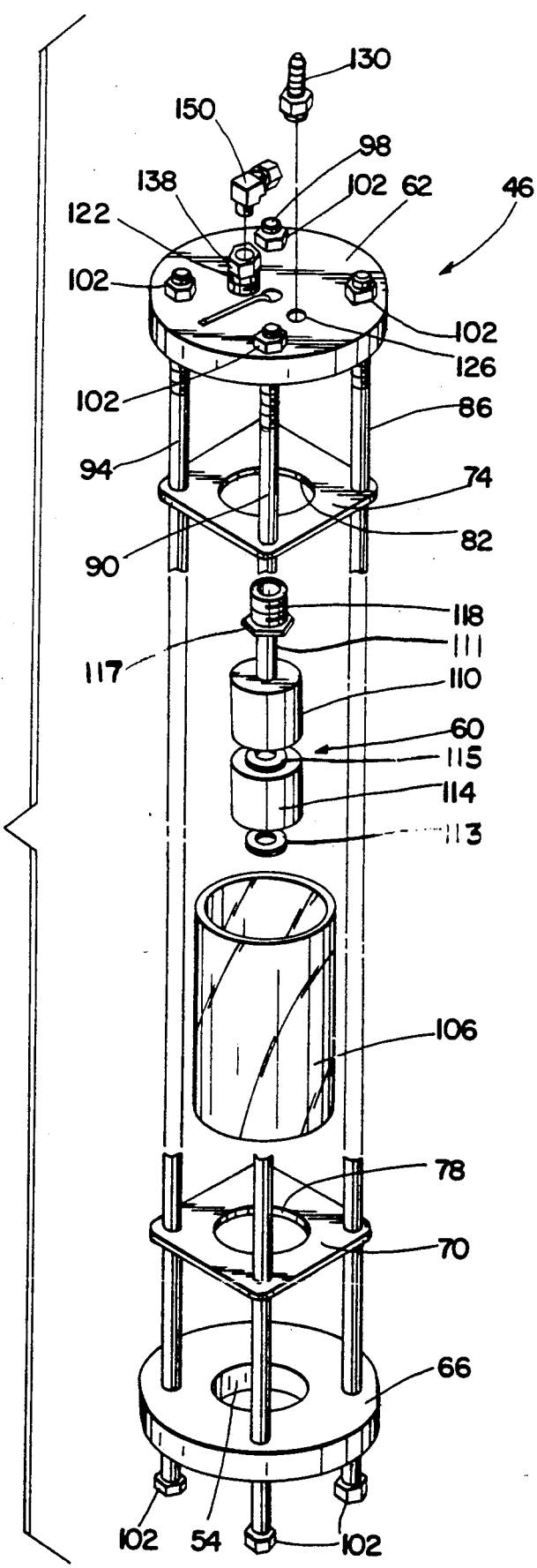
FIG. 3 is an exploded view of the float assembly of FIG. 2.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DESCRIPTION OF THE PREFERRED EMBODIMENT(S)

A steam cooking device 10 embodying the invention is illustrated in FIG. 1. Before the invention is explained in detail, it should be understood that the float assembly of the present invention can be utilized with almost any steam cooking device which has a steam generator to heat water to produce steam and inject this steam into the cooking chamber of the steam cooking device, the operation of which is well-known in the art. An example of a suitable steam cooking device is the Steamcraft ® 5.1 Counter Type Convection Steamer manufactured by Cleveland Range, Inc. in Cleveland, OHIO.

The steam cooking device 10 includes a steam generating chamber (e.g., boiler) 14 adapted to contain water. Heating means 18 such as a heating element using gas or electric service is positioned in the steam generating chamber 14 to heat the water contained in the steam generating chamber 14. After water has been introduced into the steam generating chamber 14 via a conduit 20 or similar means, the heating means 18 is activated to heat the water to a temperature sufficient to produce steam. The steam rises to the top of the steam generating chamber 14 where it is transported and introduced into the cooking chamber 22 of the steam cooking device 10. The cooking chamber 22 is adjacent to the steam generating chamber 14 and the cooking chamber 22 includes a bottom wall 26 and sidewalls 30 and 34. The cooking chamber 22 further includes tray slots 38 positioned on the sidewalls 30 and 34. Food that is to be cooked, thawed, etc., is typically placed on trays placed in the tray slots 38.

The steam cooking device 10 further includes a chamber 42 located on the opposite side of side wall 34 from the cooking chamber 22. This chamber 42 is adjacent to steam generating chamber 14 and chamber 42 contains a float assembly 46 to maintain the water in the steam generating chamber 14 at a desired measured level. One such float assembly without float cleaning means is manufactured by Imo Industries, Inc. in Plainville, CONN. (Model Pilot Duty 20VA). The float assembly 46 is associated with the steam generating chamber 14 by a conduit 50 or the like extending from an aperture 54 in the bottom of the float assembly 46 through a sidewall 58 of the steam generating chamber 14. It is to be understood that the float assembly 46 may be located elsewhere than as shown in FIG. 1. The float assembly 46 may be located within the steam generating chamber 14 in another embodiment of the invention. Water from the steam generating chamber 14 flows through conduit 50 through aperture 54 in the float assembly 46 and contacts a float switch assembly 60 which functions to monitor the water level in the steam generating chamber 14. The operation of the float assembly 46 will be explained in greater detail below.

Referring to FIGS. 2 and 3 the float assembly 46 typically includes a structure comprising a top cap portion 62 and a bottom cap portion 66. The bottom cap portion 66 includes an aperture 54 and may include a gasket 70 which rests on the top of the bottom cap portion 66. Similarly, a gasket 74 may be associated with the bottom of the top cap portion 62. These gaskets 70 and 74 include apertures 78 and 82 respectively which are aligned with aperture 54 in the bottom cap portion 66. The top cap portion 62 and bottom cap portion 66, as well as their respective gaskets 74 and 70, are typically connected by four bolts 86, 90, 94 and 98 which extend through the top and bottom cap portions 62 and 66. These bolts 86, 90, 94 and 98 are typically secured to the top and bottom cap portions 62 and 66 by nuts 102. A washer may be positioned between the nuts 102 and the top and bottom cap portions 62 and 66.

The float assembly 46 further includes a generally cylindrical sleeve 106 positioned between the four bolts 86, 90, 94, and 98 and also between the top cap portion 62 and the bottom cap portion 66. The sleeve 106 surrounds the float switch assembly 60 which includes a top float 110 and a bottom float 114, each containing a magnetically operated reed switch. The top float 110 and bottom float 114 are slidably mounted on a stem 111 which is typically threadably secured to aperture 122 in the top cap portion 62 by an extension 118. The bottom float 114 slides along the stem 111 between disks 113, 115 and is part of a safety circuit that activates the heating element 18. During normal operation, the bottom float 114 is in its highest position adjacent disk 115 and is fully submersed until the unit 10 is shut off. When the water is allowed to drain, the bottom float 114 will drop, causing the reed switch to open and preventing the heating element from heating.

Top float 110 is the water level control float. Top float 110 moves along stem 111 between disks 115 and 117. As the water level rises, top float 110 moves up to disk 117 causing the switch to open and stops the inflow of water into chamber 14.

The top cap portion 62 may contain an aperture 126 which receives an attachment 130 which functions as a vent for the steam generating chamber 14. The top cap portion 62 may further contain an aperture 134 extending through the entire cap portion 62. This aperture 134 is illustrated in FIG. 4. The aperture 134 is counterbored to accommodate a standard fitting 138 inserted in the counterbore 142 and secured therein. The fitting 138 allows water or other fluid to be injected through the small end 146 of aperture 134 toward the float switch assembly 60. The small opening 146 will act as a nozzle as fluid is forced through it causing an exiting spray or jet stream depending on the size of the opening. An elbow 150 which is in communication with a water supply (not shown) may be secured to the fitting 138 to direct the water into the fitting 138. To one of skill in the art various plumbing arrangements would be apparent for supplying a fluid, such as water, to the fitting 138.

Instead of counterboring aperture 134, it could be entirely bored through and tapped to accommodate a nozzle (not shown) which may be threadably secured into the aperture 134. The nozzle may be part number ¼GDI from Spraying Systems, Inc. in Wheaton, IL.

In operation, water is introduced into the steam generating chamber 14 of the steam cooking device 10. As the water level in the steam generating chamber 14 rises, the water level reaches a conduit 50 or the like extending through sidewall 58 of the steam generating chamber 14. Water is continuously added until the water in the steam generating chamber 14 reaches a predetermined measured level.

Once the water level reaches the conduit 50, water travels through the conduit 50 to the float assembly 46 which is located in chamber 42. The water enters the float assembly 46 through aperture 54 and is retained in the float assembly 46 by sleeve 106. The float switch assembly 60 is connected to a solenoid valve or the like (shown generally at 154) which is operably connected to the water supply (not shown) which introduces water into the steam generating chamber 14. When the top float 110 is moved up by the water level and contacts disk 117, the steam generating chamber 14 has sufficient water and the solenoid valve 154 closes and does not allow any more water to enter the steam generating chamber 14. However, as the heating means 18 is activated and heats the water to produce steam, the water level in the steam generating chamber 14 goes down. When this occurs, the top float 110 of the float switch assembly 60 drops down from disk 117. In this event, the water level control float 110 switch "closes," which causes the solenoid valve 154 to open and allow more water into the steam generating chamber 14.

Over time, minerals and scale from the water tend to build up on the float switch assembly 60 causing the float switch assembly 60 to "stick" and malfunction. In the past, the float 46 was removed and cleaned by hand or replaced with a new float. The subject invention offers an automatic means for cleaning the float assembly 46 without removing it from the chamber 42. The fitting 138 or nozzle is positioned in a cap portion 62 or other structure of the float assembly 46 to spray the float assembly 46 to keep it clean. If the float assembly 46 is located in the steam generating chamber 14, a nozzle or fitting may be installed in a wall of the steam generating chamber 14 near the float assembly to be used for cleaning the float assembly, as described. The location of the nozzle or fitting is not restricted to the cap portion 62 of the float assembly 46.

The steam cooking device 10 may be equipped with an automatic blow-down system known to those of skill in the art which is typically activated once a day for a few minutes to clean the steam cooking device 10. When this blow-down system is activated, water may be injected through fitting 138 and toward the float switch assembly 60. The water is forced through the small end 146 of the aperture 134 such that the water exits through the bottom of the top cap portion 62 toward the float switch assembly 60 in a jet-like fashion. This water spray effectively keeps mineral deposits and scale from forming on the float switch assembly 60 and eliminates the sticking problems caused by a build up of deposits.

Various features of the invention are set forth in the following claims.

What is claimed is:

1. A steam cooking device comprising:

a steam generating chamber adapted to contain water;

means for heating said water to a temperature sufficient to produce steam;

a float assembly including a float switch assembly associated with said steam generating chamber to maintain said water at a predetermined level; and means for spraying a fluid directly onto said float switch assembly at a sufficient pressure to keep mineral deposits and scale from forming on the body portion while said float assembly remains associated with said steam generating chamber.

2. The steam cooking device of claim 1 further comprising a cooking chamber and means for transporting steam from said steam generating chamber to said cooking chamber.

3. The steam cooking device of claim 1 wherein said float assembly includes a cap portion and wherein said spraying means is positioned on said cap portion.

4. The steam cooking device of claim 3 wherein said cap portion has therein an aperture and said spraying means extends into said aperture.

5. The steam cooking device of claim 4 wherein said spraying means includes a nozzle extending into said aperture and wherein said nozzle sprays a fluid directed generally toward said float switch assembly of said float means.

6. The steam cooking device of claim 5 wherein said nozzle sprays water through said aperture directed at said float switch assembly.

7. The steam cooking device of claim 4 wherein said aperture has therein a counterbore and wherein a fitting extends into said counterbore and injects a fluid through a small opening at one end of the aperture, directed generally toward said float switch assembly.

8. The steam cooking device of claim 1 wherein said float assembly is in a chamber adjacent to said steam generating chamber and wherein said float assembly is associated with said steam generating chamber by conduit means.

9. A float assembly for use in a steam cooking device comprising:

a float switch assembly;

a cap portion secured to said float assembly, said cap portion having therein an aperture; and spray means extending into said aperture for spraying a fluid directed directly at said body portion at a sufficient pressure keep mineral deposits and scale from forming on the float switch assembly.

10. The float assembly of claim 9 wherein said float assembly is used in a steam cooking device having a steam generating chamber adapted to contain water to maintain said water at a predetermined level.

11. The float assembly of claim 9 wherein said spray means includes a nozzle extending into sid aperture and wherein said nozzle sprays a fluid directed generally toward said float switch assembly.

12. The float assembly of Claim 11 wherein said fluid is water.

13. The float assembly of claim 9 wherein said aperture has therein a counterbore and wherein a fitting extends into said counterbore and sprays a fluid through a small opening in a jet stream directed generally toward said float switch assembly.

14. The float assembly of claim 13 wherein said fluid fitting sprays water through said aperture generally toward said float switch assembly.

15. A float assembly for use in maintaining a predetermined water level in a steam generating chamber of a steam cooking device, said float assembly comprising:

a float switch mechanism contained within a structure forming said float assembly;

means associated with said structure for providing a fluid flow path whereby a fluid is directed to be sprayed at said float switch thereby cleaning said float switch of mineral deposits and scale; and said fluid flow means adapted to function automatically and periodically to keep said float switch clean.

* * * * *